United States Patent [19]

Despres et al.

[11] Patent Number: 5,970,409
[45] Date of Patent: Oct. 19, 1999

[54] PROTOCOL FOR LOCAL ROUTING OF CALLS COMING FROM THE SWITCHED TELEPHONE NETWORK IN A CELLULAR NETWORK

[75] Inventors: François Despres, Bievres; Olivier Blondeau, Rambouillet, both of France

[73] Assignee: France Telecom, Paris, France

[21] Appl. No.: 08/784,378

[22] Filed: Jan. 17, 1997

[30] Foreign Application Priority Data

Jan. 18, 1996 [FR] France .................................. 96 00538

[51] Int. Cl.⁶ ....................................................... H04Q 7/20
[52] U.S. Cl. ........................ 455/445; 455/411; 379/93.14
[58] Field of Search .................................. 455/445, 410, 455/411, 432, 435, 450; 379/93.15, 93.14

[56] References Cited

U.S. PATENT DOCUMENTS

| | | |
|---|---|---|
| 5,325,424 | 6/1994 | Grube . |
| 5,357,558 | 10/1994 | Yoshikawa .............................. 455/445 |
| 5,440,613 | 8/1995 | Fuentes .................................... 455/432 |
| 5,467,381 | 11/1995 | Pectonen et al. ....................... 455/445 |
| 5,521,962 | 5/1996 | Chaver, Jr. .............................. 455/411 |
| 5,771,275 | 6/1998 | Brunner et al. ......................... 455/445 |

FOREIGN PATENT DOCUMENTS

0520194A2  12/1992  European Pat. Off. . .

OTHER PUBLICATIONS

IEEE Journal on Selected Areas in Communications, Two–Way Calling Public CTS Telepoint System, vol. 13, No. 5, by Foo et al, Jun. 1995.

Electrical Communication, vol. 64, No. 1, Jun. 1990, by Betts et al, "ISDN and Intelligent Network Based Telepoint Service".

*Primary Examiner*—Edward F. Urban
*Attorney, Agent, or Firm*—Larson & Taylor

[57] ABSTRACT

A method for local routing of calls coming from the switched telephone network in a cellular mobile network includes, following a procedure of locating/authenticating the mobile subscriber transmitter/receiver with a fixed radio locating FRLT terminal, forwarding to the FRLT personal communications service subscription data, such as a radio receiver/transmitter (RTR) confidential code and identification number, in attributing a direct inward dialling number (DID number), to the transmitter/receiver and, within the FRLT, forwarding the DID number and the RTR confidential code to a service access authentication center (SAAC). Upon receiving an incoming call from a subscriber telephone handset (STH), an interrogation message with the RTR telephone number is forwarded to the SAAC, and from the SAAC to the FRLT. Upon reception of the interrogation message, a call message containing at least the DID number is forwarded from the SAAC to the FRLT. A transmitter/receiver call procedure is thus initiated from the FRLT, and, upon the transmitter/receiver response, the communication between the STH and the transmitter/receiver is thus established.

5 Claims, 6 Drawing Sheets

FIG.3a.
INITIALIZATION ON LOCATING/AUTHENTICATING

FIG.3b.
ACTUAL ROUTING

FIG.4a.

TRANSACTIONS 2 AND 3   FIG.3a.

TRANSACTION 2  FIG 3b

| T21 | REQUEST |
|---|---|
| LENGTH | |
| NUMBER REQUESTED | |

| T22 | RESPONSE |
|---|---|
| LENGTH | |
| NUMBER REQUESTED | |
| CALL-BACK NO. | |
| DID | |

FIG.4b.

PROTOCOL FOR LOCAL ROUTING OF CALLS COMING FROM THE SWITCHED TELEPHONE NETWORK IN A CELLULAR NETWORK

BACKGROUND OF THE INVENTION

Cellular telephone networks are being developed widely at the present time.

One reason for this upsurge is, in addition to the access for subscribers to this type of network, access in a substantially transparent way for subscribers of the public switched telephone network, and vice versa.

Figure 1A:
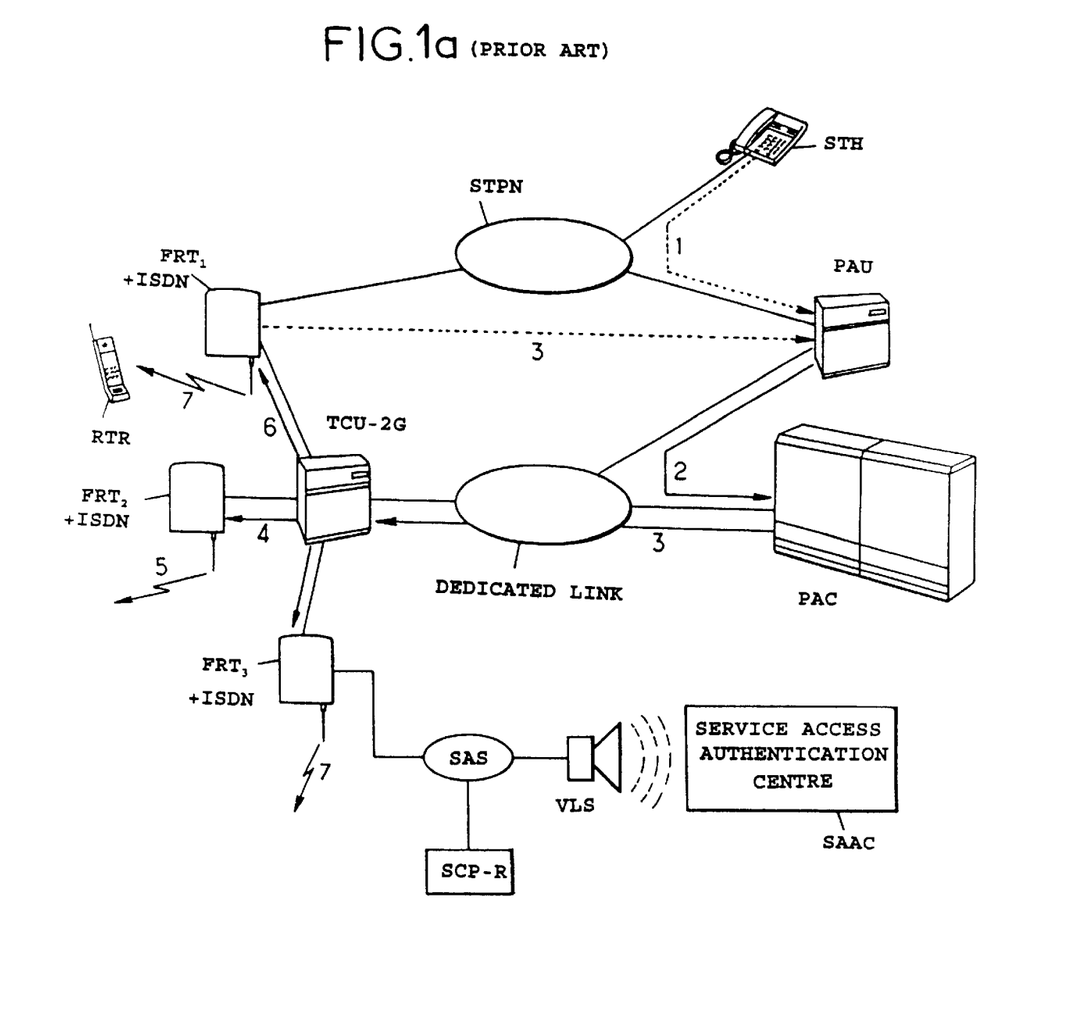

In contrast to the public switched telephone network, a cellular telephone network consists, as represented in FIG. 1a, of at least one radio transmitter/receiver RTR per mobile subscriber, linked by radio with a plurality of fixed radio terminals $FRT_1$ to $FRT_3$, interconnected in a tree structure by terminal connecting units TCU to a mobile subscriber authentication center PAC, the whole constituting the cellular telephone network proper.

The interconnection between the telephone handset STH of a subscriber of the public switched telephone network PSTN is provided by a unit for access to the mobile telephone network (PAU).

In present-day cellular telephone networks, such as the POINTEL cellular telephone network in Europe, a procedure or protocol for routing incoming calls onto the cellular telephone network, these calls originating from the public switched telephone network, performs specific operations, made necessary by reason of the configuration of the cellular telephone network itself.

In the first place, the abovementioned protocol conventionally requires a procedure for locating each mobile subscriber within the mobile telephone network.

Figure 1B:
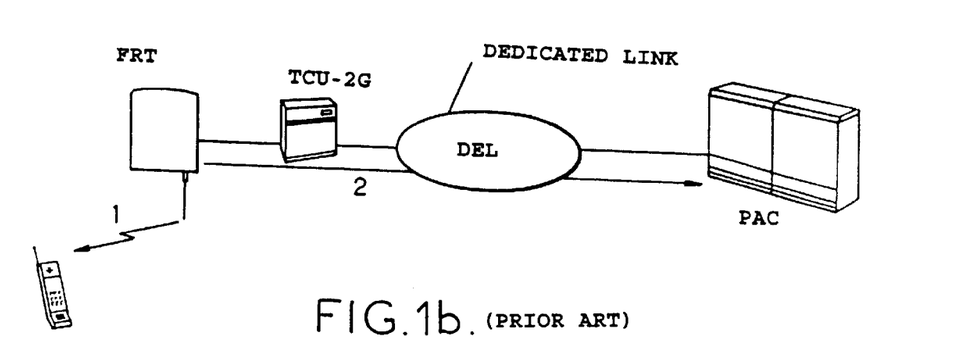

It will be recalled, in connection with FIG. 1b, that such a procedure successively implies:

the sending by the mobile subscriber of a locating request 1;

the forwarding 2 of this request to the mobile subscriber authentication center PAC, via the FRT, the TCU concerned and a dedicated transmission line network;

the verification of access rights, then the memory storage, by the PAC, of the network address or identity of the FRT terminal identified as locating terminal, so as to allow the latter to route any subsequent incoming call to this mobile subscriber.

When such an incoming call appears, it is, by reference to FIG. 1a, handled by the unit for access to the mobile telephone network PAU, on the basis of a database giving information on all the daughter FRT terminals which are interconnected to the same terminal connecting unit, TCU.

Such a protocol for handling an incoming call is summarized below in connection with FIG. 1a and entails, by virtue of the sending of requests or successive messages where the dashed lines represent the transmission of messages by voice and the solid lines the transmission of messages by dedicated link, the following stages:

1. The RTR is assumed to be located in the vicinity of the locating terminal $FRT_1$. For example, the caller from the public switched telephone network dials the call number of the mobile called party, which is forwarded to the PAU constituting, within the PAU, a first half-call.

2. The PAU, having available parameters for locating the called mobile subscriber, indicates to the PAC that a call request exists intended for this mobile subscriber, and communicates a number for calling the mobile subscriber to the mobile subscriber authentication center PAC.

3. The PAC calls the TCU with the locating terminal $FRT_1$ attached, indicating the call number.

4. The TCU indicates to the locating terminal $FRT_1$ that the transmitter/receiver RTR with the call number corresponding to this mobile subscriber is being sought.

5. The locating terminal $FRT_1$ embarks on a polling procedure in order, by sending call messages, to search for the transmitter/receiver RTR of this mobile subscriber on the radio link. After a set time, of the order of a few seconds, in the absence of a response from the mobile subscriber in question, the locating terminal $FRT_1$ sends its connecting TCU a negative report. The procedure of calling the locating terminal constitutes a second half-call.

6 and 6'. The connecting TCU sends each of the daughter terminals $FRT_2$, $FRT_3$, other than the locating terminal $FRT_1$, simultaneously, a request to search for the transmitter/receiver RTR of the mobile subscriber at the corresponding call number.

7. Each daughter terminal embarks on a polling procedure similar to that of stage 5 previously conducted by the locating terminal, each call constituting a second half-call.

7'. When a daughter terminal $FRT_2$, $FRT_3$, has found the transmitter/receiver of the mobile subscriber in question, that is to say when a message acknowledging reception of the last call generated by the terminal is received back, this terminal rings the transmitter/receiver RTR so as to call the user mobile subscriber.

8. When this user mobile subscriber picks up his transmitter/receiver RTR, the abovementioned daughter terminal, $FRT_2$ for example, calls the PAU back via the connecting TCU and a dedicated telecommunications network, the PAU then joining the two half-calls together.

The abovementioned protocol exhibits drawbacks, relating essentially to the structure of the mobile radio telephone network itself. Among these drawbacks, it may firstly be mentioned that the daughter terminals are handled manually when one or more FRT terminals are added.

It may also be mentioned that the locating and the incoming calls in the mobile telephone network are handled by specific equipment units of the network.

Figure 1C:
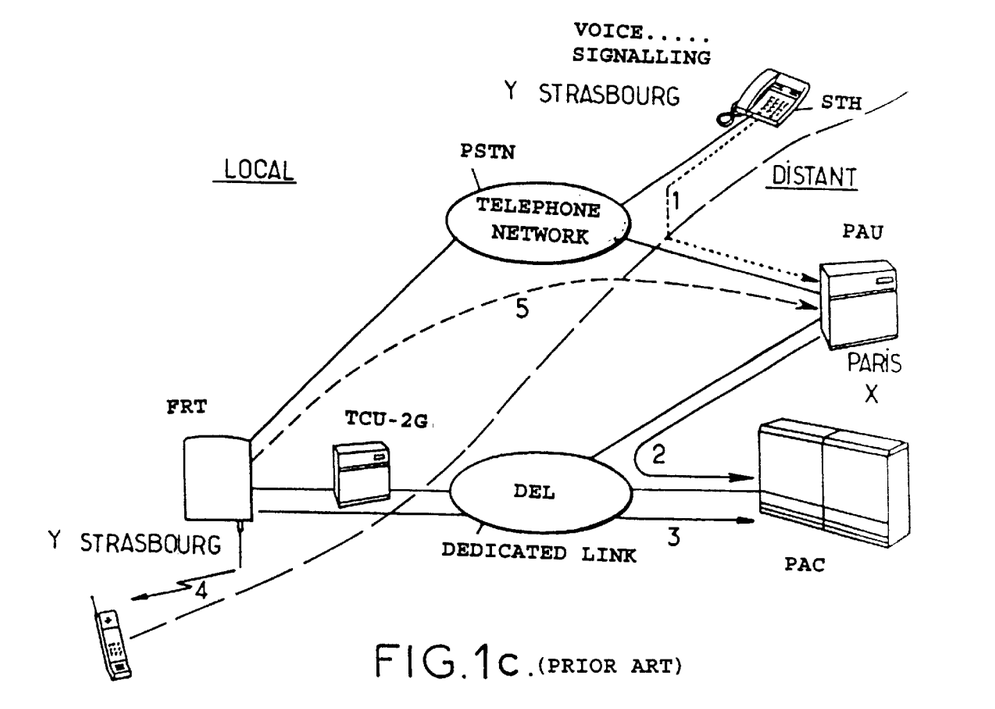

Finally, mention may be made of the fact that the solutions employed in the mobile telephone network do not make it possible to avoid the effect known as the "trombone" effect, as illustrated in FIG. 1c. If, as represented in the abovementioned FIG. 1c, a mobile subscriber from a town X, Paris, on a visit to a town Y, Strasbourg, is temporarily located, by the previously described protocol, in the town Y, Strasbourg, an incoming call originating from a subscriber of the public switched telephone network, and intended for this mobile subscriber, will necessarily pass through the town X, Paris. This is the case especially for an incoming call originating from a subscriber of the public switched telephone network, located in the town Y, Strasbourg, for which such a call has to pass through the town X, Paris, needlessly using up resources of the switched telephone network. This gives rise to the notion of a "trombone" effect illustrating the outwards and return path of the call between towns Y, Strasbourg, and X, Paris.

Such a routing of the incoming telephone calls furthermore gives rise to increased costs for the users.

SUMMARY OF THE INVENTION

The object of the present invention is to remedy the drawbacks mentioned above.

A further subject of the present invention is the optimization of the management of mobile subscribers of a cellular telephone network, by virtue of the use of the services and infrastructures of the public switched telephone network, particularly of the personal communications service of the switched telephone network and the Direct Inward Dialling, D.I.D., function of the integrated services digital network, ISDN.

The protocol for local routing of incoming calls which are generated by the telephone handset of a subscriber of the public switched network in a cellular telephone network, which is the subject of the present invention, is employed when the telephone handset is interconnected to a unit for access to the mobile telephone network, this unit consisting of a switch for local access to the services of an integrated services digital network, the cellular telephone network including at least one mobile subscriber transmitter/receiver complete with a telephone call number, for which the incoming call is intended, and a plurality of fixed radio terminals interconnected in clusters according to a tree structure to connecting units and to a mobile subscriber authentication center by dedicated digital transmission lines. The fixed radio terminals are equipped with cellular radio telephone transmission channels, each include a set of direct inward dialling numbers, and are each linked to a service access authentication center via the local service access switch, a service control point and a voice locating server. The mobile subscriber transmitter/receiver is furthermore equipped with means for access to the personal communications service of the switched telephone network on the basis of an identification number and of a confidential code, the telephone call number, the identification number and the confidential code being attributed to the mobile subscriber transmitter/receiver.

According to one particularly noteworthy aspect, the protocol according to the invention consists in:

implementing a procedure, from the mobile subscriber transmitter/receiver, for locating/authenticating this transmitter/receiver, via the mobile telephone network and the mobile subscriber authentication center, and, upon the mobile subscriber transmitter/receiver being located and authenticated by a fixed radio locating terminal, forwarding, from the mobile subscriber authentication center to the fixed radio locating terminal, the personal communication service subscription data, identification number and confidential code of the mobile subscriber transmitter/receiver, furthermore, within the fixed radio terminal, attributing to this mobile subscriber transmitter/receiver a free direct inward dialling number, forwarding, from the locating terminal to the service access authentication center, via the voice locating server, the direct inward dialling number attributed, the identification number and the confidential code, the address of the fixed radio locating terminal associated with the mobile subscriber transmitter/receiver being stored in memory within the service access authentication center, and upon an incoming call for the telephone call number of this mobile subscriber transmitter/receiver generated by this switched telephone handset to the service control point, forwarding, from the service control point to the service access authentication center, an interrogation message including at least the telephone number of the mobile subscriber transmitter/receiver;

upon reception of this interrogation message forwarding, to the fixed locating terminal, from the service access authentication center, via the service control point, a call message containing at least the direct inward dialling number attributed;

from the fixed radio locating terminal, implementing a procedure of calling the mobile subscriber transmitter/receiver, and, upon the mobile subscriber responding establishing communication with the telephone handset.

This makes it possible to confine the transaction between the telephone handset and the mobile subscriber transmitter/receiver only to the sub-network handled by the switch for local access to the services of the integrated services digital network.

The protocol which is the subject of the present invention finds an application to the management of mobile telephone networks in which the fixed radio terminals are equipped with mobile radio telephone transmission channels, with the personal communications service of the switched telephone network and the D.I.D. function of the integrated services digital network ISDN.

BRIEF DESCRIPTION OF THE DRAWINGS

It will be better understood on reading the description and on perusing the drawings below in which, in addition to FIGS. 1a, 1b and 1c relating to the prior art.

FIG. 4a represents the structure of various messages making it possible to implement transactions 2 and 3 of the initialization/authentication stage of FIG. 3a;

DESCRIPTION OF THE PREFERRED EMBODIMENTS

A more detailed description of the protocol for local routing of calls coming from the switched telephone network in a cellular network, the subject of the present invention, will now be given in connection with FIG. 2.

Prior to describing the protocol for local routing of incoming calls in accordance with the subject of the present invention, a reminder of the hardware elements of the cellular telephone network and of the public switched telephone network, allowing the above-mentioned protocol to be implemented, will be given in connection with the abovementioned FIG. 1a.

As represented in FIG. 1a, any telephone handset of a subscriber of the public switched network, bearing the reference STH, is interconnected to a unit for access to the mobile telephone network, denoted PAU. This unit generally consists of a switch for local access to the services of an integrated services digital network, for example. The cellular telephone network includes at least one transmitter/receiver, denoted RTR, of which a mobile subscriber is the holder, this transmitter/receiver RTR being equipped with a telephone call number to which, obviously, the incoming call generated by the telephone handset STH has to be addressed. The cellular telephone network also comprises a plurality of fixed radio terminals, denoted $FRT_1$ to $FRT_3$ in FIG. 1a, these fixed radio terminals being interconnected in clusters according to a tree structure to a connecting unit denoted TCU-2G. Clearly, to constitute a network, several connecting units TCU-2G exist, each grouping together a certain number of fixed radio terminals connected in clusters. Each connecting unit TCU-2G is linked to a mobile subscriber authentication center, denoted PAC, via dedicated digital transmission lines, or dedicated links. Moreover, the unit for access to the mobile telephone network, PAU, is also linked to the authentication center PAC by a similar dedicated link.

Specifically, it is pointed out that each fixed radio terminal $FRT_1$ to $FRT_3$ is equipped with cellular radio telephone transmission channels allowing the sending and receiving of radio messages to the radio transmitter/receiver RTR as well as with the personal communications services of the switched telephone network and with the D.I.D. function of the integrated services digital network, denoted ISDN. The mobile subscriber and the transmitter/receiver RTR which he uses are considered to be equipped with resources for access to the personal communications services PCS of the switched telephone network. Each previously mentioned fixed radio terminal includes a set of direct inward dialling numbers, DID numbers, and are each linked to a service access authentication center, denoted SAAC in FIG. 1a, via a local service access switch, denoted SAS, of a service control point SCP-R and of a voice locating server denoted VLS. The equipment fit of each fixed radio terminal in an infrastructure allowing access to the PCS services of the switched telephone network is conventional and, that being so, will not be described in detail.

The mobile subscriber transmitter/receiver RTR is furthermore equipped with means for access to the PCS services of the switched telephone network on the basis of an identification number and of a confidential code. It will be understood, obviously, that the abovementioned confidential code and identification number are thus attributed to the mobile subscriber transmitter/receiver RTR. Thus, the mobile subscriber, who is the holder of the transmitter/receiver RTR, has available parameters for access to the PCS services, via the switched telephone network, these parameters consisting of the identification number and the confidential code, as well as of a telephone number on which the subscriber can be contacted via the mobile telephone network.

Having regard to the elements described above, and as will now be explained in detail in relation to FIG. 2, the protocol which is the subject of the present invention comprises a first stage, called stage of initialization on locating/authenticating of the mobile subscriber, this first stage being followed by a second stage of actual routing of an incoming call to the mobile subscriber who has been subjected to the abovementioned process of initialization on locating/authenticating.

Figure 2:
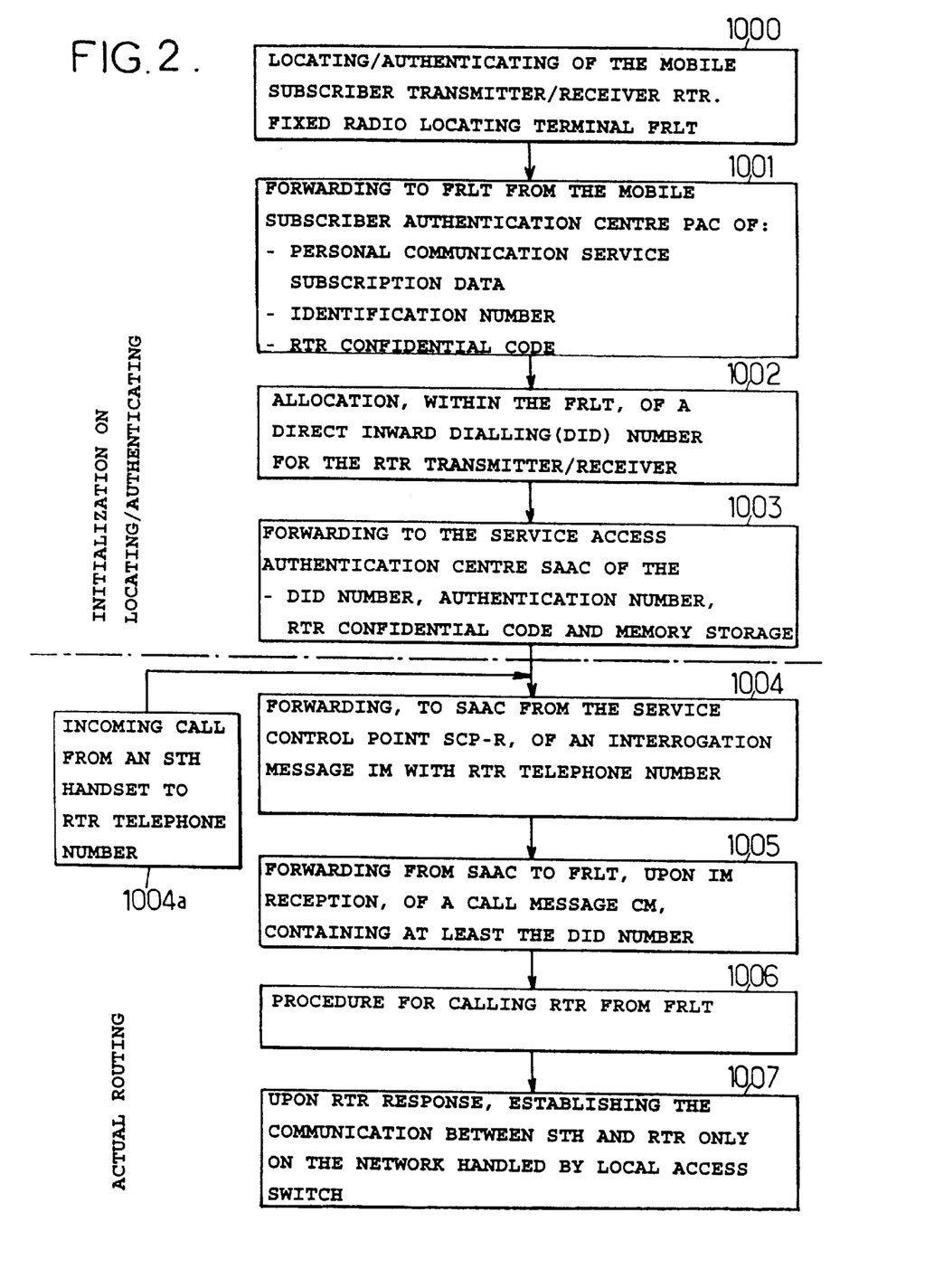
FIG. 2 represents a flow chart illustrating the protocol for local routing of calls coming from the switched telephone network in a cellular telephone network.

As will be observed in FIG. 2, the stage of initialization on locating/authenticating consists, at a stage denoted 1000, in implementing a procedure, from the mobile subscriber transmitter/receiver RTR, for locating/authenticating via the mobile telephone network and the mobile subscriber authentication center PAC. This stage 1000 has the effect, upon locating/authenticating the mobile subscriber transmitter/receiver RTR, of determining a fixed radio terminal, called locating terminal, designated by FRLT. It will obviously be understood, by reference to FIG. 1a, that the fixed radio locating terminal FRLT may, depending on the location of the mobile subscriber and of the transmitter/receiver RTR which is in his keeping, be one of the fixed radio terminals represented in FIG. 1a. The stage 1000 of locating/authenticating the transmitter/receiver RTR may be implemented conventionally, as will be described in greater detail later in the description. It will be understood, in particular, that the abovementioned stage 1000, in order to determine a fixed radio locating terminal FRLT, may comprise a substage in which the corresponding mobile subscriber's radio transmitter/receiver RTR is authenticated by the mobile subscriber authentication center PAC.

The abovementioned stage 1000 is then followed by a stage 1001, which consists in forwarding, from the mobile subscriber authentication center PAC to the fixed radio locating terminal FRLT, the personal communication services PCS subscription data as well as the identification number and the confidential code of the corresponding mobile subscriber radio transmitter/receiver RTR.

The abovementioned stage 1001 is then followed by a stage 1002 consisting, within the fixed radio locating terminal FRLT, in attributing a direct inward dialling DID number, this DID number being a number attributed by the ISDN network. It is pointed out that the DID number is a free number as far as the fixed radio locating terminal FRLT is concerned, and that this number is attributed temporarily for the transmitter/receiver RTR, as will be described later in the description.

The abovementioned stage 1002 is then followed by a stage 1003 consisting in forwarding, from the fixed radio locating terminal FRLT to the service access authentication center SAAC, via the voice locating server VLS, the DID number, the authentication number and the confidential code for access to the PCS services of the transmitter/receiver RTR mentioned above.

The abovementioned stage 1003 of forwarding to the access authentication center SAAC is performed via the service access center SAAC and the service control point SCP-R via the voice locating server VLS. The voice locating server VLS then records the location of the mobile subscriber, the locating parameters consisting more particularly of the DID call number for the fixed radio locating terminal FRLT.

In the event of an incoming call originating from a telephone handset STH to the RTR telephone number, this event bearing the reference 1004a in FIG. 2, the protocol which is the subject of the present invention then consists, in a stage of actual routing of this incoming call, in implementing a stage denoted 1004b, consisting in forwarding an interrogation message, denoted IM, from the service control point SCP-R to the service access authentication center SAAC. This interrogation message IM includes at least the telephone number of the radio transmitter/receiver RTR of the called mobile subscriber. Clearly, by virtue of the stage 1003 mentioned above in the description, the service access authentication center SAAC, knowing the current location parameters and the parameters for access to the PCS services by the mobile subscriber and by the transmitter/receiver RTR which is associated with him, then, in a stage 1005, allows forwarding, to the fixed locating terminal FRLT, upon reception of the abovementioned message IM, of a call message CM containing at least the DID number attributed to the mobile subscriber and to the transmitter/receiver RTR at the fixed locating terminal FRLT. The abovementioned stage 1005 is then followed by a stage 1006 consisting of a procedure of calling the radio transmitter/receiver RTR over the radio channel of the mobile telephone network from the fixed radio locating terminal FRLT. Clearly, in the course of this call procedure, the terminal FRLT periodically, by an action known by the name of "polling", searches for the transmitter/receiver RTR and makes it ring.

When the radio transmitter/receiver RTR responds to the calling procedure 1006, the abovementioned stage 1006 is then followed by a stage 1007 consisting in establishing communication between the telephone handset STH and the radio transmitter/receiver RTR, this communication being established on the network, that is to say at the local level, which is the only network handled by the local access switch SAS.

In a general way, it will be understood that the protocol for local routing of incoming calls which are generated by the telephone handset of a subscriber of the public switched network in a cellular telephone network in accordance with the subject of the present invention makes use of the management of the DID numbers of the ISDN network so as to handle the incoming calls to the mobile subscribers of the mobile telephone network like temporary fixed subscribers. In fact, any mobile subscriber equipped with a radio transmitter/receiver RTR and recording these parameters for access to the PCS services in fact becomes, in a way which is totally transparent to any subscriber of the public switched telephone network making use of a STH handset, a subscriber to the DID numbers service of the fixed radio terminal, the locating terminal, at which the mobile subscriber has been located.

It will also be understood that, by virtue of the particular use of the DID numbers of the ISDN network, this use being combined with the PCS service of the switched telephone network, in accordance with the protocol for local routing of incoming calls which is the subject of the present invention, this protocol makes it possible to obtain a unique number for calling the transmitter/receivers RTR of the mobile subscribers wherever they happen to be located geographically, with the "trombone" effect being completely absent from the public switched telephone network.

In other words, and by reference to FIG. 1c, for any call originating from a telephone handset STH of the public switched telephone network, from a given geographical site to a mobile subscriber who has carried out a locating stage at a fixed radio terminal situated in the same geographical site, the joining of the two calls, by virtue of the temporary attributing of a DID number to the abovementioned mobile subscriber at the fixed radio locating terminal FRLT, no longer requires the call to transit via the unit for access to the mobile network, PAU, situated in another completely different geographical site.

A more detailed description of the stages for initialization on locating/authenticating and for actual routing of an incoming call of the protocol, the subject of the present invention, as represented in FIG. 2, will now be given in relation to the structural configuration of the mobile telephone network and of the fixed network, such as the ISDN network in particular, with reference to FIGS. 3a and 3b.

Figure 3A:
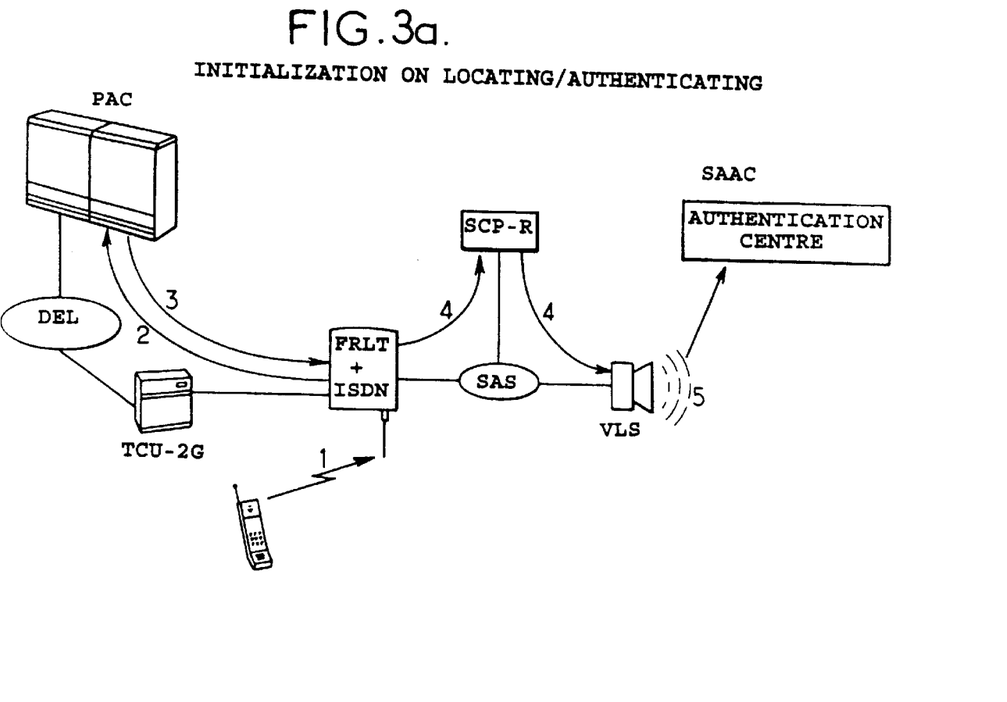
FIG. 3a represents a particular non-limiting embodiment of the stage of initialization on locating/authenticating of FIG. 2.

In the abovementioned FIG. 3a, the successive stages have been described allowing use of the stage of initialization on locating/authenticating represented in FIG. 2, these successive stages being described in the form of transactions between the various constituent elements of the corresponding networks.

In the abovementioned FIG. 3a, the transactions may, for example, be implemented in the following way.

transaction 1: the mobile subscriber initiates the locating/authenticating procedure corresponding to stage 1000 of FIG. 2. This operation can be implemented within the RTR by operating the RTR locating key or keys.

The abovementioned transaction 1 is then followed by a transaction 2 between the fixed radio terminal FRT and the authentication center PAC; in the course of this transaction 2 the abovementioned authentication center actually carries out the authentication of the radio transmitter/receiver RTR. This operation will not be described in detail, as it corresponds substantially to an operation of conventional type.

The abovementioned transaction 2 is followed by a transaction 3 in the course of which the authentication center PAC sends to the fixed radio locating terminal FRLT the data for access to the PCS services of the switched telephone network. The abovementioned transaction 3 corresponds to stage 1001 of FIG. 2.

This transaction 3 is itself followed by a transaction 4 in the course of which the fixed radio locating terminal FRLT sets up the call with the voice locating server VLS in order to forward to the latter the parameters for access to the PCS services mentioned above, the confidential code as well as a free DID number.

The transaction 4 is followed by a transaction 5 in the course of which the voice locating server VLS records the location of the mobile subscriber and forwards these elements to the service access authentication center SAAC by the transaction 6 for storage in memory.

The locating mechanism of the PCS service may then be as follows:
definition of a location by default, chosen at the time when the mobile subscriber takes out a subscription to the PCS services;
indication by the mobile subscriber, at any instant during a visit, of the telephone number where he wishes to be contacted. To do this, the mobile subscriber to the PCS services may dial in the access code via the ISDN network in order to communicate with the voice locating server VLS and thus to forward his card or identification number, his confidential code as well as the telephone number at which he wishes to be contacted.

If appropriate, the mobile subscriber may also indicate a duration of location after which the default location again becomes active.

Hence, this operating mode is transparent to the mobile subscriber, who indicates only that he wishes to carry out the locating of his radio transmitter/receiver RTR under the fixed radio locating terminal FRLT. The data for access to the PCS services, card number, confidential code, are then stored within the mobile subscriber authentication center PAC. The location number is then handled by the fixed radio locating terminal FRLT, which generates its own DID numbers and associates them with each mobile subscriber who has carried out the stage of locating at the corresponding fixed radio locating terminal FRLT.

Clearly, with the number of DID numbers being limited for each corresponding fixed radio terminal, the location duration is limited in terms of time.

As for the management of the DID numbers of the ISDN network, it is pointed out that each fixed radio terminal FRT possesses a set of DID numbers associated with these two B channels, channels specific to the ISDN network. Each DID number is thus associated with a mobile subscriber who carries out locating under the corresponding fixed radio terminal.

When the fixed radio locating terminal FRLT submits a request for locating to the PCS service, that is to say during stage 1003 of FIG. 2, by means of the transactions 4, 5 and 6 mentioned above, a location duration is determined. In fact, a DID number is capable of being used for a subscriber carrying out a location when this DID number is not being used for another mobile subscriber. A DID number again becomes free when the location becomes timed out, this time-out possibly being managed, for example, by the mechanism for access to the PCS services and by the fixed radio locating terminal FRLT.

Figure 3B:
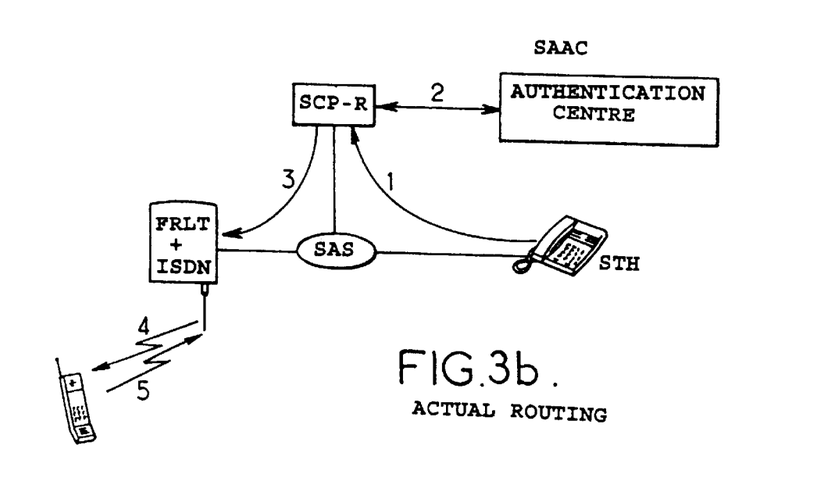
FIG. 3b represents a particular non-limiting embodiment of the routing stage proper of FIG. 2.

In FIG. 3b, the actual routing stage has been represented in the form of transactions between the various constituent elements of the network.

The various transactions comprise a transaction 1 in the course of which the subscriber of the public switched telephone network, from the telephone handset STH, dials the number of the mobile subscriber, this transaction occurring between the handset STH and the service control point SCP-R via the local service access switch SAS.

The abovementioned transaction 1 is followed by a transaction 2 in the course of which the service control point SCP-R interrogates the service access authentication center SAAC, which has received all the parameters for locating the corresponding mobile subscriber in the course of the transaction 6 described above in connection with FIG. 3a.

The abovementioned transaction 2 is then followed by a transaction 3 in the course of which the ISDN network sets up the call to the fixed radio terminal FRLT at which the mobile subscriber who is the holder of the corresponding radio transmitter/receiver RTR is located. It will be recalled that the mobile subscriber is the holder not only of the mobile subscriber telephone call number, the one on which he wishes to be called, but also of the parameters for access to the PCS services.

Further to the abovementioned transaction 3, a transaction 4 takes place, in the course of which the corresponding fixed radio locating terminal FRLT in fact carries out the procedure of calling the RTR from the abovementioned fixed radio locating terminal, this transaction 4 corresponding to stage 1006 of FIG. 2.

The abovementioned transaction 4 is then followed by a transaction 5 in the course of which, when the mobile subscriber picks up the phone, the fixed radio locating terminal FRLT joins the two calls together to form the interconnection.

When a DID number of a fixed radio locating terminal FRLT reaches the expiry of the locating time interval which has been allotted to it, the fixed radio locating terminal releases this DID number and may, for example, store it in memory in a list of numbers which can be used again. The management units of the PCS service then also make it possible to cancel the location of the mobile subscriber's telephone call number under the fixed radio locating terminal FRLT and to activate the locating of this subscriber by default. No action is then necessary, in terms of the mobile telephone network.

A more detailed description of the structure of the messages constituting the transactions between the various elements of the network, as they are represented in FIGS. 3a and 3b, will now be given in connection with FIG. 4a, corresponding to FIG. 3a, and 4b corresponding to FIG. 3b.

In the set of messages used to implement the abovementioned transactions, the various notations and acronyms have the following meanings:

PID: serial number of the radio transmitter/receiver RTR,

LID: operator identification number,

FA: identification number of the service requested,

AUTH-PREF: message for identifying to the network the function which the mobile subscriber prefers to use, AUTH-KEY: identification of the authentication functions available in the radio transmitter/receiver RTR, RAND: random number making it possible to implement the identification process, TRD: mobile subscriber number, IDSO: code relating to the LID+FA which were defined above, CPIN: result of the authentication, IDAB: mobile subscriber number similar to the TRD number defined above.

Figure 4A:
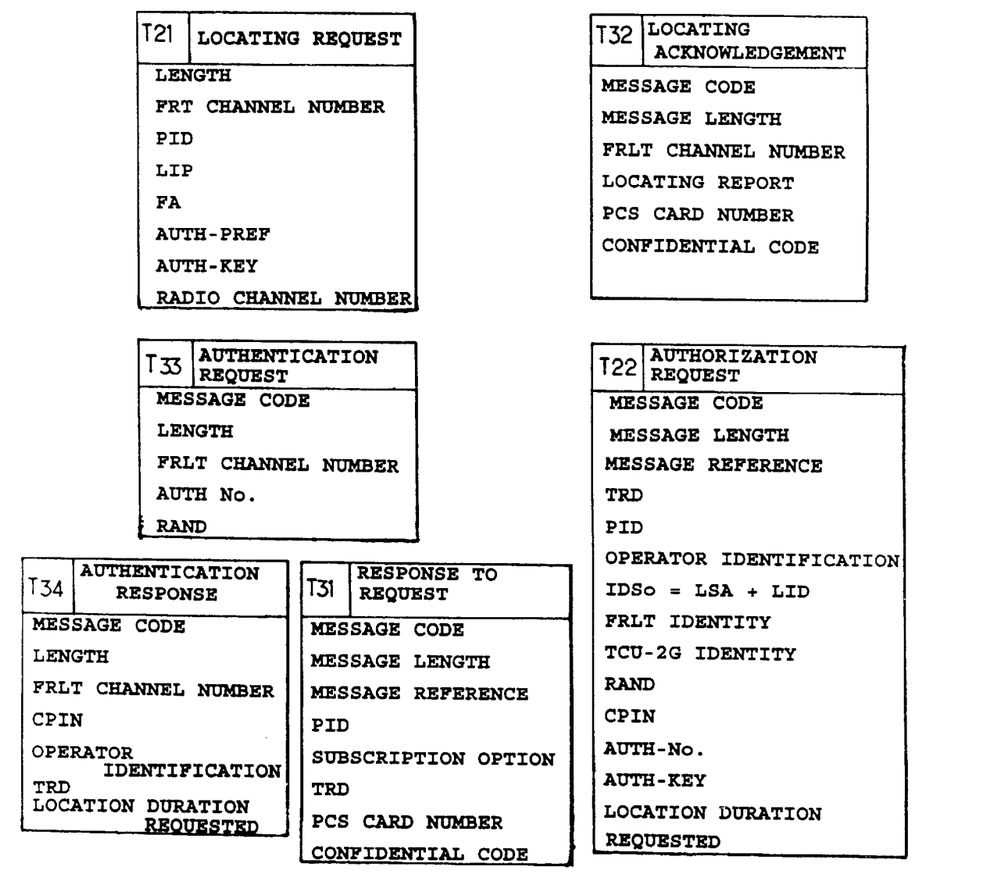

As represented in FIG. 4a, the transactions 2 and 3 of FIG. 3a are represented in the form of successive messages between the fixed radio locating terminal FRLT, the corresponding connecting unit TCU-2G and the mobile subscriber authentication center PAC.

The transaction 2 comprises the successive messages $T_{21}$ between fixed radio locating terminal FRLT and $T_{22}$ between the connecting unit TCU-2G and the authentication center PAC.

The message $T_{21}$ is a locating request message between fixed radio locating terminal FRLT and the connecting unit TCU-2G.

The message $T_{21}$ comprises:

a length field, a field with the channel number of the fixed radio terminal, a PID field, a LID field, a FA field, an AUTH-PREF field, an AUTH-KEY field, as well as a field with the radio channel number.

The transaction 2 further comprises a message $T_{22}$ between the connecting unit TCU-2G and the authentication center PAC.

This message $T_{22}$ is an authorization request formulated for the authentication center PAC, this message comprising:

a message code field, a messages length, messages reference field, a TRD field, a PID field, an operator identification field, an IDSO field corresponding to the LSA+LID field, a field with the identity of the fixed radio terminal FRLT, a field with the identity of the connecting terminal TCU-2G, a RAND field, a CPIN field, a field relating to the authentication reference, and a field relating to the authentication key, as well as a field with the location duration requested for the corresponding DID number.

The transaction 3 comprises the message $T_{31}$ between the authentication center PAC and the corresponding connection unit TCU-2G. This message $T_{31}$ is a locating response message. This message comprises:

a message code field, a message length field, a message reference field, a PID field, a subscription option field, a TRD field, a field with the PCS service card number, a confidential code field.

The transaction 3 also comprises a location acknowledgement message denoted $T_{32}$ between the connecting unit TCU-2G and the fixed radio locating terminal FRLT. This message comprises:

a message code field, a message length field, a field with the channel number of the fixed radio locating terminal FRLT, a locating report field, a PCS card number field, a confidential code field.

In addition to the abovementioned message $T_{32}$, the transaction 3 also includes an authentication request message $T_{33}$, this message being sent between the connecting unit TCU-2G and the fixed radio locating terminal FRLT. This message comprises:

a message code field, a message length field, a field with the channel number of the fixed radio locating terminal FRLT, an authentication number field, a RAND field.

The transaction 3 finally comprises an authentication response message $T_{34}$ sent between the fixed radio locating terminal FRLT and the connecting unit TCU-2G, this message, obviously, being sent in response to the authentication request message $T_{33}$.

The message $T_{34}$ comprises the fields:

message code, message length, channel number of the fixed radio locating terminal FRLT, CPIN field, operator identification field, TRD field, requested location duration field.

It will obviously be understood that, as far as the various messages of the transaction 3 are concerned, the messages $T_{33}$ and $T_{34}$ are earlier in time than the message $T_{32}$, which in fact constitutes the location acknowledgement message.

Finally, the messages constituting the transaction 2 in FIG. 3b between the service control point SCP-R and the service access authentication center SAAC mentioned above have been represented in FIG. 4b.

Figure 4B:
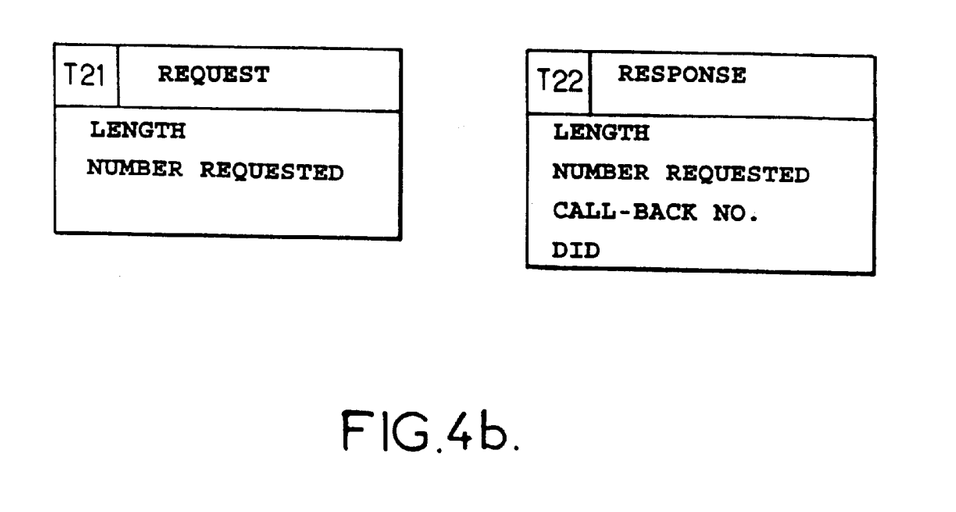
FIG. 4b represents the structure of various messages making it possible to implement transaction 2 of the routing stage proper of FIG. 3b.

The transaction 2 of FIG. 3b comprises, as represented in FIG. 4b, a request message $T_{21}$ in fact making it possible to transport the incoming calls request originating from the handset STH.

The request message $T_{21}$ comprises a length field and a number-requested field.

Likewise, the abovementioned transaction 2 also comprises a response message, denoted $T_{22}$, sent between the service access authentication center SAAC and the service control point SCP-R. This message $T_{22}$ is in fact a response message, obviously including a length field, a number-requested field and a return DID number field, these items of information making it possible, clearly, to carry out the joining of the two calls within the fixed radio locating terminal FRLT.

A protocol has thus been described for local routing of calls coming from the switched telephone network in a cellular network, which gives particularly good performance in that, by virtue of the use of the infrastructure of an integrated services digital network ISDN associated with the fixed radio terminals FRT of a mobile telephone network, the protocol which is the subject of the present invention in fact makes it possible to dispense with the equipment units of the mobile telephone network which are specific to the routing of the abovementioned incoming calls, this routing then being handled at the local level by existing equipment units of the fixed network such as the abovementioned ISDN network.

The protocol which is the subject of the present invention makes it possible, in particular, to overcome the "trombone" effect mentioned above in the description, the handling of a local call for a mobile subscriber situated in the same geographical region as the local call being, by virtue of the use of the protocol for routing incoming calls, the subject of the present invention, carried out at the local level, by virtue of the use of the structural elements of the corresponding ISDN network.

We claim:

1. In a system having a protocol for local routing of incoming calls which are generated by the telephone handset of a subscriber of the public switched telephone network in a cellular mobile telephone network, said telephone being interconnected to a unit for access to said cellular mobile telephone network, said unit comprising a switch for local access to the services of an integrated services digital network, said cellular mobile telephone network including at least one mobile subscriber transmitter/receiver complete with a telephone call number, for which the incoming call is intended, and a plurality of fixed radio terminals interconnected in clusters according to a tree structure to connecting units and to a mobile subscriber authentication center by dedicated digital transmission lines, said fixed radio terminals being equipped with cellular radio telephone transmission channels, with a personal communications service of said public switched telephone network and with a direct inward dialling function of the integrated services digital network, and each fixed radio terminal further being linked to a service access authentication center via a local service access switch, a service control point and a voice locating server, said mobile subscriber transmitter/receiver further being equipped with means for access to a personal communications service of said public switched telephone network on the basis of an identification number and of a confidential code, said telephone call number, said identification number and said confidential code being attributed to said mobile subscriber transmitter/receiver, a method comprising the steps of:

implementing a procedure, from said mobile subscriber transmitter/receiver, for locating/authenticating this transmitter/receiver, via said cellular mobile telephone network and said mobile subscriber authentication center, and, upon said mobile subscriber transmitter/receiver being located and authenticated, forwarding, from said mobile subscriber authentication center to said fixed radio locating terminal, said personal communication service subscription data, identification number and confidential code of said mobile subscriber transmitter/receiver;

attributing to said mobile subscriber transmitter/receiver, within said fixed radio terminal, a free direct inward dialling number, an attributed direct inward dialling number being thus associated with said mobile subscriber transmitter/receiver;

forwarding, from said locating terminal to said service access authentication center, via said voice locating server, said attributed direct inward dialling number, said identification number and said confidential code, an address of a fixed radio locating terminal associated with said mobile subscriber transmitter/receiver being stored in memory within said service access authentication center, and, upon an incoming call for the telephone call number of said mobile subscriber transmitter/receiver generated by said telephone handset of said public switched telephone network to said service control point;

forwarding, from said service control point to said service access authentication center, an interrogation message including at least said telephone number of said mobile subscriber transmitter/receiver;

upon reception of said interrogation message, forwarding, to said fixed radio locating terminal, from said service access authentication center, via said service control point, a call message containing at least said direct inward dialling number attributed;

from said fixed radio locating terminal, implementing a procedure of calling said mobile subscriber transmitter/receiver, and, upon said mobile subscriber transmitter/receiver responding;

establishing communication with said telephone handset, thereby allowing the transaction between said telephone handset and said mobile subscriber transmitter/receiver to be confined only to a sub-network handled by a switch for local access to services of said integrated services digital network.

2. The method of claim 1, wherein the step, within said fixed radio terminal, of attributing a free direct inward dialling number to said mobile subscriber transmitter/receiver is temporary, each free direct inward dialling number being thus attributed to a mobile subscriber transmitter/receiver for a defined duration.

3. The method of claim 2, wherein the step in the course of which said authentication center sends to said fixed radio locating terminal is implemented by sending of a message in response to a locating request including at least a message code field, a message length field, a message reference field, a radio transmitter/receiver serial number field, a subscription option field, a personal communication service card number field and a confidential code field.

4. The method of claim 1, wherein the step in the course of which said authentication center sends to said fixed radio locating terminal is implemented by sending of a message in response to a locating request including at least a message code field, a message length field, a message reference field, a radio transmitter/receiver serial number field, a subscription option field, a personal communication service card number field and a confidential code field.

5. The method of claim 1, wherein the step of forwarding from said service control point to said service access authentication center an interrogation message is implemented by sending a request message including at least a length field and a number-requested field.

\* \* \* \* \*